(12) United States Patent
Victor et al.

(10) Patent No.: US 9,852,625 B2
(45) Date of Patent: Dec. 26, 2017

(54) METHOD AND SYSTEM FOR PROVIDING A TUTORIAL MESSAGE TO A DRIVER OF A VEHICLE

(71) Applicant: VOLVO TRUCK CORPORATION, Göteborg (SE)

(72) Inventors: Trent Victor, Västra Frölunda (SE); Peter Kronberg, Kärna (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 14/428,070

(22) PCT Filed: Jan. 15, 2013

(86) PCT No.: PCT/SE2013/000004
§ 371 (c)(1),
(2) Date: Mar. 13, 2015

(87) PCT Pub. No.: WO2014/042571
PCT Pub. Date: Mar. 20, 2014

(65) Prior Publication Data
US 2015/0262484 A1 Sep. 17, 2015

(30) Foreign Application Priority Data
Sep. 17, 2012 (SE) ...................................... 1251038

(51) Int. Cl.
*G08G 1/0962* (2006.01)
*G08G 1/16* (2006.01)
(Continued)

(52) U.S. Cl.
CPC .......... *G08G 1/0962* (2013.01); *G08G 1/167* (2013.01); *G09B 9/04* (2013.01); *G09B 19/16* (2013.01); *G09B 19/167* (2013.01)

(58) Field of Classification Search
None
See application file for complete search history.

(56) References Cited

U.S. PATENT DOCUMENTS 6,092,021 A 7/2000 Ehlbeck et al.
6,227,862 B1 5/2001 Harkness
(Continued)

FOREIGN PATENT DOCUMENTS

JP 2007133486 A 5/2007
JP 2010092438 A 4/2010
(Continued)

OTHER PUBLICATIONS

International Search Report (Nov. 13, 2013) for corresponding International Application PCT/SE2013/000004.
(Continued)

Primary Examiner — Jean-Paul Cass
(74) Attorney, Agent, or Firm — WRB-IP LLP

(57) ABSTRACT

A method is provided for providing a tutorial message to a driver in a vehicle using an in-vehicle tutorial system including a multimodal user interface. The method includes assigning an area of improvement, including at least one tutorial task, to the tutorial system, identifying a driving context for which a tutorial task is to be performed, based on the tutorial task and the driving context, selecting a tutorial message encouraging a desired driving behavior, and providing the selected tutorial message to the driver using the multimodal user interface.

13 Claims, 2 Drawing Sheets

(51) Int. Cl.
*G09B 9/04* (2006.01)
*G09B 19/16* (2006.01)

(56) References Cited

U.S. PATENT DOCUMENTS

| | | | |
|---|---|---|---|
| 2002/0120374 A1 | 8/2002 | Douros et al. | |
| 2002/0146667 A1* | 10/2002 | Dowdell | G09B 7/02 |
| | | | 434/62 |
| 2005/0137766 A1 | 6/2005 | Miyakoshi et al. | |
| 2006/0041378 A1 | 2/2006 | Cheng et al. | |
| 2006/0224314 A1 | 10/2006 | Oguchi | |
| 2010/0055649 A1 | 3/2010 | Takahashi et al. | |
| 2010/0178637 A1* | 7/2010 | Lecointre | B60R 16/0236 |
| | | | 434/29 |
| 2010/0253541 A1 | 10/2010 | Seder et al. | |
| 2011/0169625 A1 | 7/2011 | James et al. | |
| 2011/0205044 A1 | 8/2011 | Enomoto et al. | |
| 2012/0065834 A1 | 3/2012 | Senart et al. | |
| 2012/0135382 A1* | 5/2012 | Winston | G09B 19/167 |
| | | | 434/65 |
| 2014/0257635 A1* | 9/2014 | Haubenschild | G06F 3/013 |
| | | | 701/36 |

FOREIGN PATENT DOCUMENTS

| | | |
|---|---|---|
| JP | 2010231776 A | 10/2010 |
| JP | 2012113613 A | 6/2012 |
| WO | 0067236 A1 | 11/2000 |
| WO | 2009002483 A1 | 12/2008 |
| WO | 201 138060 A1 | 12/2010 |
| WO | 2012015403 A1 | 2/2012 |

OTHER PUBLICATIONS

International Preliminary Report on Patentability (Jan. 21, 2015) for corresponding Application PCT/SE2013/000004.

Japanese Official Action (Sep. 8, 2016) for corresponding Japanese App. 2015-531885.

* cited by examiner

METHOD AND SYSTEM FOR PROVIDING A TUTORIAL MESSAGE TO A DRIVER OF A VEHICLE

BACKGROUND AND SUMMARY

The present invention relates to a method for providing a tutorial message to a driver of a vehicle for encouraging a desired driving behavior of the vehicle. The invention also relates to a corresponding tutorial system and to a computer program product.

The operation of a vehicle involves a large plurality of different tasks, including for example the more general issues relating to distance and lane keeping, awareness in general (e.g. when driving on a straight road or entering a roundabout), and more complicated traffic situations as well as more specifically in relation to safe and economic operation of the vehicle.

Modern vehicles are typically provided with different systems for simplifying these tasks, using for example electronic systems for optimized gear shifting, adaptive cruise control systems taking into account distance keeping, etc.

Additionally, much progress has been made in implementing educational systems in the vehicle for providing feedback to a driver of the vehicle for pointing towards an unsafe operational behavior of the vehicle. Such system may for example allow for the possibility to instruct the driver to take a break in case of the system identifying the driver to becoming drowsy, or for providing a feedback in case the driver fails to apply to regulations relating to the operation of the vehicle. For example, instant feedback may be provided to the driver in case he/she is distracted by a hand-held smartphone (e.g. looks away from the road for long periods of time).

Even though improvements have been made in correcting the driver when failing to be law abiding or not driving in a safe and economic manner, it would be desirable to provide further improvements for encouraging the driver to operate the vehicle according to a desired driving behavior. Specifically, it would be desirable to allow for the possibility of adjusting the driver feedback to in the most optimal way make the driver conform to the expectations placed on the driver in a specific driving context.

According to an aspect of the invention, the above is at least partly met by a method for providing a tutorial message to a driver in a vehicle using an in-vehicle tutorial system comprising a multimodal user interface, the method comprising: assigning the tutorial system with an area of improvement, comprising at least one tutorial task, identifying a driving context for which the tutorial task is to be performed, based on the tutorial task and the driving context, selecting a tutorial message encouraging a desired driving behavior, and providing the selected tutorial message to the driver using the multimodal user interface.

An assigned area of improvement may be general and describe a whole domain, such as for example "efficient driving" or "safe driving". In other contexts or embodiments, an area of improvement may be more specific and describe a lower level category that could be a sub-part of the mentioned domains, for example "economic driving/fuel consumption", "wear and tear", "inattention" and "risk behavior". The categories themselves may comprise specific tutorial tasks or situations that may be a drivers day to day driving tasks, such as for example how to shift gears in a fuel efficient manner in a steep hill, how to handle the vehicle in a difficult crossing or safe headway distance keeping. In some contexts or embodiments it may be possible to assign one tutorial task or a plurality of tasks as the area of improvement.

The invention is based on the understanding that an efficient and pedagogic manner of improving a driver behavior with respect to various aspects of driving is to encourage a desirable behavior of a driver in a vehicle in response to various driving events. The area of improvement is assigned to a tutorial system which then presents tutorial messages to the driver when a driving context where tutoring is required is identified. Thereby, the tutorial message can be based not only on the specific task, but also on the conditions under which the task is to be performed, such as for example external-, vehicle- or driver related conditions.

A driving context may comprise an operational context of the vehicle and a driver context. The operational context of the vehicle may then include environmental conditions such as rain, snow, dark etc. Operational context may also include vehicle speed, heavy traffic, lane change, queue ahead and similar vehicle and traffic related conditions. The driver context on the other hand relates to the state of the driver and may refer to parameters such as driver drowsiness, workload, distraction level, intent, impairment etc.

The driver is provided with a vehicle-integrated driver tutorial system which uses information from basic vehicle systems (e.g. engine system, climate system, tachograph, etc.) active safety systems, systems that capture critical driving events (e.g. incidents, near-crashes, crashes), systems that capture targeted tutorial events (e.g. how to handle a particular vehicle-trailer combination optimally on certain road segments), and systems that are capable of transferring information (e.g. CAN data, active safety system data, extra sensor data such as smartphone accelerometer or GPS data) and video (e.g. video captured from cameras integrated in the vehicle, from a smartphone, or from extra cameras) using telematics (e.g. in-vehicle telematics systems, smartphones) to and from an off-vehicle analysis center (e.g. a training center providing on-line chat service, recorded messages, manual or automatic analysis).

The tutorial message may preferably be provided in the form of an audio, voice, visual, or haptic output, or combinations thereof, from the multimodal user interface of the tutorial system. A multi-modal interface should be understood as an interface capable of providing an output to the driver through at least two of the modes audio, voice, visual, or haptic output. The form of the delivery of the tutorial message naturally depends on a range of parameters such as type of event, environmental circumstances, and driver condition. For example, a tutorial message encouraging the driver to look to the left in an intersection may combine a voice command with a visual indication. Furthermore the visual indication may either be based on the desired behavior, e.g. a visual indication in the left part of the windscreen. Alternatively, or in combination, the visual indication may be based on an identified behavior of the driver, e.g. if the driver is looking to the right, an indication may be provided on the right side of the windscreen, indicating that the driver should look to the left.

In one embodiment of the invention, the method may further comprise logging a driver response to the provided tutorial message and determining a correlation between the desired driving behavior and the driver response.

The vehicle-integrated driver tutorial system may enable not only the determination of driving contexts, for which tutorial tasks may be performed, but also logging of the driver response after a tutorial message has been provided. The tutorial system may for example record the timing, speed, position and brake pedal pressure during navigation through a difficult crossing. Other possible parameters that may be recorded are for example the driver's reaction time, visual attention direction, use of direction indicators if needed, etc. The logged information is evaluated and compared with a desired driving behavior. The correlation between the desired driving behavior and the logged driver response may for example be used to determine or quantify the goal fulfillment or skill level of the driver for the performed tutorial task.

According to one embodiment of the invention, the method may further comprise determining a goal fulfillment based on the correlation between the desired driving behavior and the driver response. Tracking goal fulfillment can be a tool used to track the progress or skill level of a driver, which in turn can be used to provide certification or to evaluate driving lessons.

In one embodiment of the invention, the method may further comprise determining an accumulated goal fulfillment by adding a plurality of determined goal fulfillments.

The inventors have realized that a quantification and accumulation of the goal fulfillment may be useful for pedagogical development of the driver but also for further use, such as manual or automatic analysis and also adaptation of different steps in the method for the tutorial system. In the context of the present invention the quantification of the accumulated goal fulfillment may enable determination of a skill level which would correspond to the progress or proficiency of the driver, this may be quantified into at least two predetermined skill levels, where a lower level would correspond to a more novice driver and a higher level would correspond to a more skilled driver. More preferably, a finer quantification may additionally comprise an intermediate level and possibly a top performer or elite level. In other embodiments it may be more preferable to have an even finer scale, such as but not limited to a numerical scale from one to one hundred.

The skill level may be representing the general driving proficiency of the driver or the skill level in any one of the exemplified domains, categories or specific tutorial tasks. Advantageously the method could enable simultaneous tracking of separate skill levels in a plurality of tutorial tasks and based on these skill levels determine correlating skill levels in categories, that in turn may determine skill levels in domains and that in turn may determine the general skill level of the driver. It may be the case that some correlations in this chain of skill levels may be strong while other correlations are weak or even non-existing and there may also be cases where a tutorial task correlates to more than one category or domain. For example the skill level in the task of keeping a headway distance may correlate to both safe driving and efficient driving, and possibly to several categories in each domain.

The method according to various embodiments of the invention may also advantageously be used to monitor and train drivers in a commercial fleet, where a fleet manager can identify specific areas of improvement in individual drivers. The method also provides an efficient manner of teaching drivers to handle new vehicles or difficult traffic situations, reducing the need for personal tutoring. Additionally, tracking of goal fulfillment may be used as a "game" or "competition" for drivers or for groups of drivers in a fleet, thereby providing extra incentives for drivers to reach predetermined goals.

Furthermore, the operator of a fleet of commercial vehicles needs to train drivers to drive a vehicle optimally both regarding safety behaviors and regarding fuel efficiency. Improved driver behavior is strongly associated with cost reduction in the form of crash related costs, wear and tear-related costs, and fuel costs.

The driver experience is one where both the vehicle's intelligent vehicle systems and an on-line connection with an analysis center are used to give driver training tips and coaching.

Additionally, the method may comprise selecting an area of improvement to assign to the tutorial system based on the goal fulfillment or the accumulated goal fulfillment.

By determining how well the driver performs in the assigned area of improvement in relation to the desired behavior suggested by the tutorial message, the assignment of future areas of improvement can be controlled. For example, if the correlation between desired and detected behavior is low for a specific task, the tutorial system may determine that the driver should perform the task at least one more time with tutoring. On the other hand, if correlation between desired and detected behavior is high, it may be determined that the driver is capable of handling the task without the need for further tutoring. Furthermore, logged driver behavior can be provided to a database and further evaluated, either for use in offline-mode tutorials or in order to track the proficiency of a specific driver with respect to various areas of improvement. Logged driver behavior may also be used to define or update a schedule of tasks to be performed.

According to one embodiment of the invention, assigning an area of improvement may comprise manually assigning an area of improvement by the driver, remotely assigning an area of improvement by a third party or automatically assigning an area of improvement by the tutorial system. The assignment of an area of improvement may for example be performed by the driver if the driver realizes that tutoring is desirable for a particular type of driving events, or if a particular mode of driving is desired, such as a "fuel efficient mode". As mentioned above, areas of improvement may also be set in advance or remotely by fleet managers, by driving instructors or as part of a scheduled tutorial regiment aimed at maintaining the proficiency level of particular driving tasks.

Furthermore in one embodiment of the invention the allowability of manually assigning an area of improvement by the driver may be determined based on the accumulated goal fulfillment for said driver. It may be advantageous to be able to control the possibility to manually assign an area of improvement by the driver. For example and with reference to a driver with a higher skill lever, e.g. a top performer, it may be both more efficient and result in a higher degree of driver tolerance if the driver is allowed to, and to a varying degree be responsible for, assigning areas of improvement or goals to fulfill. With reference to a driver with a lower skill level, e.g. a novice, it may be inappropriate or counterproductive to allow manual assignment of areas of improvement or goals to achieve. It may also be advantageous to vary the degree to which areas of improvement are assigned based on the accumulated goal achievement, e.g. skill level. In an example of this, a driver will experience that as the personal skill level increases, the tutorial system will increasingly encourage the driver to manually assign personal areas of improvement, and as a consequence the automatically assigned areas of improvement will decrease in number, and preferably also the areas of improvement assigned by a third party, e.g. the back office unit which could be a fleet manager or a third party service provider.

In one embodiment of the invention, the tutorial message may be selected from a plurality of predetermined tutorial messages. The tutorial message or parts of the message to be provided may be selected from a plurality of predetermined messages defined for various events. However, the message generation may also be dynamic in that the message is adapted depending on the identified operational context and driver context.

Furthermore the tutorial message may be selected based on the accumulated goal fulfillment, so that for an example referencing to skill levels, the tutorial message for one operational context may be very descriptive and contain instructions for a novice driver, while the tutorial message for an intermediate driver comprises supportive tips and the tutorial message for a top performer may comprise only a post trip review for self evaluation.

The method according to one embodiment of the invention enables the use of a driver's logged response as a future reference for the desired driving behavior. For example if a driver that achieves a better result than the desired driving behavior in terms of for example fuel efficiency or wear and tear, this may trigger the tutorial system to use this logged behavior as the future desired driving behavior.

According to another aspect of the invention there is provided an in-vehicle tutorial system for providing a tutorial message to a driver, the system comprising: a multimodal user interface, a plurality of sensors configured to determine a driving context, a processing unit configured to determine a tutorial message encouraging a desired behavior to be provided based on a driving context identified by the plurality of sensors and on an assigned area of improvement, the processing unit being further configure to provide the tutorial message to the driver through the multimodal user interface. The multimodal interface may be configured to provide audio, voice, visual, or haptic output, or combinations thereof, to the user. The visual output may for example comprise a heads-up display (HUD) arranged in the windscreen of the vehicle or similar arrangement for dynamically providing a visual message to the driver of the vehicle. Furthermore, the audio or voice output may be directional so that an alert encouraging the driver to direct his/hers attention to the right appears to come from the right side of the vehicle.

In one embodiment of the invention, the processing unit may further be configured to evaluate a desired behavior for a tutorial task in relation to the driver response to the tutorial task and to store the evaluation result in a memory storage. The memory storage may be arranged within the vehicle embodied or it may be a remote storage with which the tutorial system communicates. Furthermore, evaluation may be performed immediately after a task has been completed, or tasks and responses can be stored for later evaluation by an external system.

Further effects and features of this aspect of the present invention are largely analogous to those described above in connection with the previous aspect of the invention.

According to another aspect of the invention there is provided a computer readable medium embodying a computer program product for providing a tutorial message to a driver in a vehicle using an in-vehicle tutorial system comprising a multimodal user interface, the computer program product comprising code configured to, when executed by a processor:

assign a tutorial task to the tutorial system, identify a driving context for which the tutorial task is to be performed, based on the tutorial task and the driving context, select a tutorial message encouraging a desired driving behavior, and provide the selected tutorial message to the driver using the multimodal user interface.

The processing unit may preferably be provided in a vehicle control unit, a computer, server or similarly, and the computer readable medium may be one of a removable nonvolatile random access memory, a hard disk drive, a floppy disk, a CD-ROM, a DVD-ROM, a USB memory, an SD memory card, or a similar computer readable medium known in the art (present and future). The present invention may be implemented using a combination of software and hardware elements.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
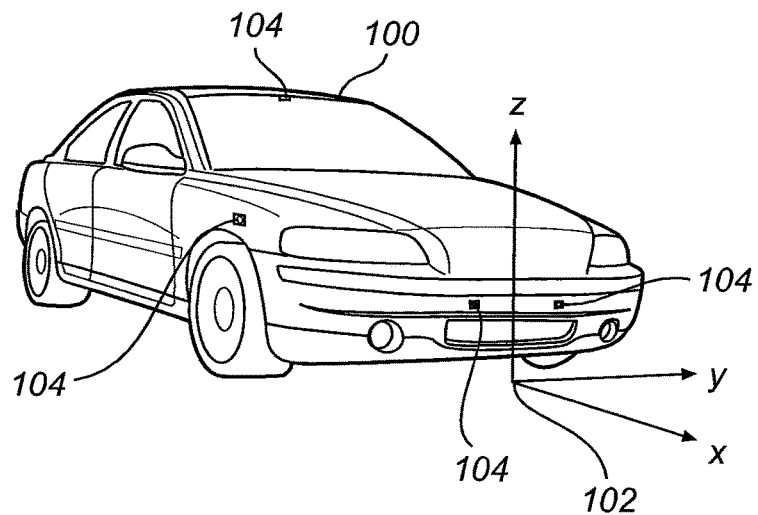
FIG. 1 is a perspective view of a vehicle equipped with external sensors and a coordinate system at its front end.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

In the following, the present invention is described with reference to a system and a method for providing a tutorial message to the driver of a vehicle. The vehicle is preferably equipped with interior sensor(s) for retrieving information of the vehicle operator and external sensor(s) for retrieving information of the vehicle operation as well as the surrounding environment of the vehicle. For the sake of better understanding, the internal and external sensors will now be described in relation to FIGS. 1-3.

Figure 2:
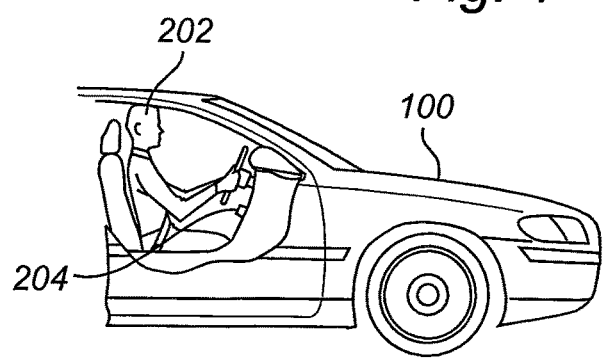
FIG. 2 is a perspective view of the interior of the vehicle, equipped with an internal sensor.
Figure 3:
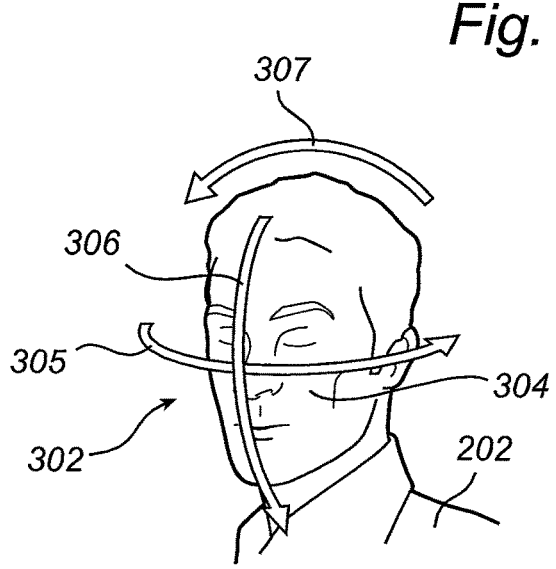
FIG. 3 illustrates a coordinate system of the face and head of a vehicle operator.

FIG. 1 shows an exemplary vehicle, here illustrated as a car 100, in which a system according to the present invention may be incorporated. The car 100 is provided with external sensors 104 arranged to detect vehicle operation, such as overtaking, vehicle speed, vehicle yaw rate, etc, and objects, and zones, surrounding environment of the vehicle, e.g. lane markings, road marks, road curves, surrounding vehicles, etc. The external sensors 104 may be e.g. cameras or radar sensors. Preferably, a combination of camera and radar sensors may be used, since the camera provides a high precision when determining the height and width of the object, whereas a radar sensor provides a high precision when determining the distance to the object. Hereby, size, position, speed, acceleration etc. of the surrounding object can be determined. FIG. 2 illustrates an interior of a car 100 including a vehicle operator 202, wherein the vehicle 100 is equipped with an internal sensor, here illustrated as a camera system 204. The camera system 204 is arranged to measure and detect the behavior of the vehicle operator 202 during vehicle operation, and may be configured to generate an operator motion input signal indicative of physiological data comprising information relating to at least one of eye, face, head and body motion of the operator of the vehicle.

Furthermore, the camera system 204 may be arranged to focus on a predetermined number of positions of the operator's face, head, or upper body. These positions may, for example, be the eyes, eye-lids, eyebrows, nose, mouth, cheek, neck, shoulders, arms, etc. The camera system 204 may be pre-calibrated for a specific operator 202 normally operating the car or being calibrated each time an operator 202 enters the driver seat of the car 100. As the camera system 204 has detected the different positions of the operator's face or head, an estimation of facial behavior is possible for the camera system 204. The camera system 204 may hence detect, e.g. head and eye direction and movement, and derivative thereof, head pose, eye saccade, combined head and eye saccade, eye closure, speed of eye closure, etc.

The camera system 204 may also detect if the head, or eyes, of the operator is rotating to the right or left (yaw), 305, rotating up or down (pitch), 306, or, in the case of the head movements, leaning towards the right or left shoulder (roll), 307. This information may then be used to determine a recent and current level of distraction, which is based on an analysis of the frequency and duration of glances away from the road (and/or to specific in-vehicle devices). Long glances away from the road are typically detrimental to safety. The same is true for extended periods of visual time-sharing, where the driver repeatedly looks back and forth between the road ahead and a secondary object (which is not a road-scene mirror).

Furthermore, the internal sensors may also, instead of, or additionally to the camera system 204, include other type of operator detecting means. This may, for example, include steering wheel sensors for detection of a steering behavior, sensors in the acceleration pedal and/or braking pedal for detection of inconsistent acceleration and/or braking of the car 100, sensors in various buttons of the car 100 to detect if, for example, the operator 202 is adjusting any of the various functionalities of the infotainment system, etc. Further examples of internal sensors may include a breath analysis sensor or pupil size sensor for monitoring state of awareness of the operator. Yet further examples may be the use of turn indicators to determine lane changing behavior.

Figure 4:
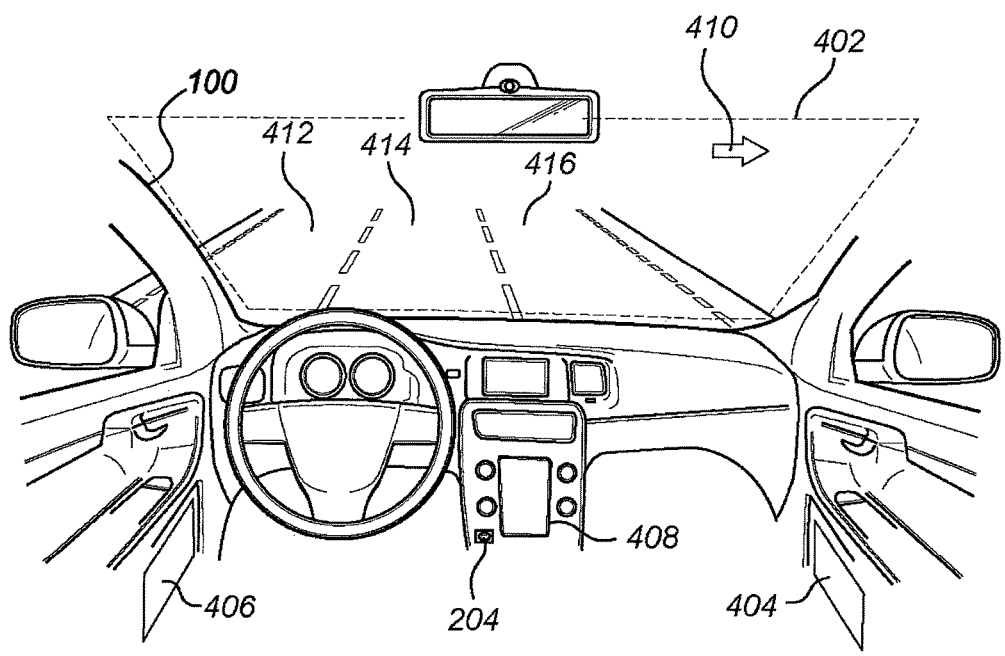
FIG. 4 illustrates a perspective view of the interior of the vehicle, equipped with internal sensors and multimodal feedback means.

With further reference to FIG. 4, the vehicle 100 is additionally provided with a multimodal interface for providing a rich feedback to the driver 202. In the illustrated example, the multimodal interface comprises a head-up display (HUD) 402, typically integrated with the windshield of the vehicle 100.

Additionally, the multimodal interface of FIG. 4 comprises a speaker 404 arranged in the right-hand side within the vehicle compartment, and a corresponding speaker 406 arranged on the left-hand side of the vehicle compartment. Additionally, a control interface 408 (e.g. touch screen) of the tutorial system may be provided for allowing the user to control or assign e.g. specific tutorial tasks or specific tutorial regiments according to the inventive concept of the tutorial system.

Furthermore, and with general reference to the invention, the HUD may be configured to allow different types of graphical instructions to appear visible to the driver 202 for encouraging the driver to behave in a specific manner, such as for example by making an "arrow" 410 pointing in a rightward direction. Such a graphical instruction may for example be arranged to appear on the HUD 402 in combination with a spoken instruction provided though the speaker 404 on the right-hand side for the purpose of providing feedback to encourage the driver to change lane from a centrally arranged lane 414 to the right lane 416 due to an upcoming traffic situation (i.e. operational context of the vehicle).

For providing a further understanding of the invention, an explanation is provided below in which the concept of the method for providing a tutorial message is exemplified in more detail.

In the present example, the general area of improvement assigned to the tutorial system is "safe driving". The driving context is that the vehicle is positioned in the middle lane 414 and that an upcoming intersection requires the driver to change lane to the right lane 416. As the tutorial system identifies the context, the driver is notified that a lane change should be performed by showing an arrow 410 in the upper right-hand corner of the HUD 402 while providing a vocal message saying "change lane to the right" from the right hand speaker 404. Furthermore, the tutorial system may take information from other vehicle safety systems into account in order to assure that it is safe to change lane, i.e. that no vehicles are present in the right lane, thereby making it possible to adjust the timing of the message so that it is provided when it is most safe to perform the desired task. Specifically, tutoring of lane keeping behavior involves measuring variation in lane position, the estimated time to lane crossing (which depends on the lateral distance to lane marking and the lateral speed). Tutoring of distance keeping behavior involves measuring the speed of the own vehicle, the speed of the lead vehicle(s) and the estimated time to collision, as well as variability in longitudinal speed, where high variability in longitudinal speed is detrimental to fuel efficiency. Furthermore, the choice of gear and speed is important when considering fuel efficiency.

In another example embodiment of the tutorial system the tutorial message is further supported by a process, wherein the analysis of the driver's performance is performed either automatically or by a person (e.g. a fleet manager or third party service provider) that determines the key areas of improvement. These areas of improvement subsequently form the basis for tutorials that will be activated when the driver gets back into the vehicle. The driver will thus receive tutorial and feedback (and logging of his/her performance) on these areas of improvement. For example, a driver may perform poorly in distance keeping (typically maintaining a too short distance to lead vehicles) and with regard to fuel economy. Thus, the driver will get tutoring on distance keeping behavior and fuel usage. The tutoring will involve target levels and the ability to meet the target levels.

Furthermore, the tutorial system detects and logs the response of the driver as a result of the provided tutorial task and performs an evaluation correlating the desired behavior of the driver with the actual behavior. Based on the evaluation, the "safe driving" area of improvement can be redefined. If correlation is high, the particular task may be removed from the general area of improvement so that no tutorial messages are provided for upcoming events of the same type. Alternatively, if correlation is low, the "safe driving" area of improvement can be redefined to provide a tutorial message for at least a given number of following upcoming events of the same type.

Additionally, the tutorial system may categorize events to further enable quantification of behavior. In an example referencing the area of improvement "safe driving", an event may be categorized into "negative" events for constructive feedback and learning, or "positive" events for positive feedback and reinforcement. Additionally, in this example, each of the mentioned categories may be divided into sub-categories; a "negative" event may be an "incident", a "near miss" or an "accident". In an "incident" the driver fails to act safely according to pre-defined criteria, e.g. preferred driving behavior. A "near miss" indicates that the driver narrowly escaped a collision after a failure to act, despite having time to act. Finally in an "accident" the driver is involved in a collision. Similarly "positive" events may be "avoided", "escaped" and "mitigated". An "avoided" event implies a proactively avoided event that could have ended up in a critical situation. In an "escaped" event the driver has actively and successfully avoided a potentially critical event, and in the event that the driver has actively and successfully reduced the impact of a safety critical situation it is categorized as "mitigated". More detailed examples may be explained in terms of situations. A driver that receives a distraction warning has had an "incident", while a driver that after a warning looks away from the road and at the same time drifts into an approaching lane has had a "near miss". If the driver experiencing the "near miss" had collided with approaching traffic, that would be classified as an "accident". In another situation a driver that proactively lowered the vehicle speed in advance of a demanding traffic situation would have the event classified as "avoided". A situation where a driver brakes and swerves to avoid a hard braking lead vehicle is classified as an "escaped" event and if the driver in this situation had just managed to lower the speed but not avoided the collision it would have been classified as a "mitigated" event. A categorization as exemplified would enable one kind of goal fulfillment, such as a driving performance score. The mentioned categories may advantageously correspond to a score that may be evaluated in one separate context or used to build an accumulated goal fulfillment such as a skill level. An "avoided" event would render the driver a high positive score, an "escaped" event awards medium positive score and a "mitigated" event a low score. Correspondingly an "incident" renders a low penalty, a "near miss" means a medium penalty and an "accident" will give a high penalty. The evaluation of the event may also take the driving context into consideration.

In another example embodiment of the invention, the driver is provided with feedback resembling that which is given by a driving instructor that would be riding along in the vehicle. Instead of having a driving instructor sit in the passenger seat, the vehicle is enabled with pre-recorded messages and visual, haptic/tactile, and sound feedback that instructs the driver what he/she was doing wrong and what should have been done instead. The system detects various violations of traffic rules and is capable of giving timely feedback just as an in-vehicle driver educator would by pointing and describing to the driver.

In one example the tutorial is administered by a back office unit, which could be a fleet manager or a third party service provider. Logged driving data is streamed in real time to the back-office unit. This unit makes use of automated analysis methods and manual analysis to determine driver performance, which is then used to adapt the tutorial content and future steps, which is fed back to the driver.

The tutorial mode may further involve increasing the sensitivity of onboard driving support systems, so that they are more easily activated when in tutorial mode. This will enable more direct feedback for the driver.

Conversely, in non-tutorial mode the systems are less sensitive.

The tutorial system may make use of a database of previously logged events (including video) for creating pedagogical tutorial messages shown to the driver as post-drive reviews for self evaluation and further tutoring.

Similarly this can be monitored by and followed-up by fleet manager, peer-driver, or in the case of novice or teen drivers, a driving instructor or parent.

In one example the driver may be classified as either novice, intermediate, skilled or top performer. The skill of a driver is task-dependent, so one person may simultaneously be skilled at one task and novice in another task. Thus in this example it is very important that the estimation of skill level is task-dependent. One person can be very skilled at reversing into docking bays and at the same time novice in his ability to be alert while driving (non-distracted).

The skill level may further be used in a framework where the coaching or tutorial arrangement is adapted based on the skill level. When the driver is deemed to be novice in his ability for a given task the tutorial message will be instructional in nature, specifying step-by-step instructions for how to perform the task successfully. Also, the system or fleet manager would typically set targets level for the novice driver, and follow up the driver's performance. Similarly, an intermediate driver will be tutored in a more coaching manner, where the tutorial message is more defined by tips and hints rather than step-by-step instructions. The system or fleet manager would provide feedback on performance. Moreover the driver will be part of setting the targets. A skilled driver will be tutored using more coaching and supporting information. The system will support the driver to make the right decisions and perform well. For example, for skilled drivers the feedback loop may instead involve self-learning tools rather than back-office monitoring and feedback, so the driver would be the primary responsible for setting his own targets and follow up performance. For a driver deemed to be a top performer, tutoring is set to a minimum, where the driver instead is encouraged to set targets and monitor performance. The performance of the driver may furthermore be used as basis for a peer standard, to which other drivers are measured. A novice driver about to reverse a trailer into a docking bay with tutoring activated will receive continuous feedback on his performance, e.g. how the truck is positioned before reversing, suitable speed of reversing, visual behavior and use of mirrors, for completing the task. In a more sophisticated embodiment, the novice driver will be supported with a map based view an optimal position of the truck before starting to reverse, as well as an optimal approach path to the docking bay. There may further be an alert in real time if deviations from the optimal path are detected. A novice driver who is driving a truck-trailer combination on a narrow and curvy road may receive tutoring on the optimal path, providing tips on how to position the truck before entering the road segment (i.e. the right amount of curve cutting to not risk hitting oncoming vehicles and at the same time not running the risk of the trailer falling into the road side ditch). Feedback will be received on the ability to adhere to the optimal driving style and on the choice of speed and handling of oncoming traffic. A driver entering a roundabout or other narrow road segment will need to take into account both surrounding traffic as well as making sure the truck and trailer can safely negotiate the hurdle without hitting anything. A novice driver may have problem positioning the vehicle in the right way, either ending up running of the curb or blocking other road users.

Examples of HMI-methods to use in tutorial mode include:

The optimal choice of speed can be indicated with a light or symbol on the speed gauge (or on the HUD or a separate display).

The choice of gear can be indicated on a cluster display, HUD or separate display.

The timing of gear changes can be indicated with a light or symbol on the rev counter.

The appropriate onset of braking (and choice of brake system—e.g. foot pedal or retarder lever) can be indicated.

All instructions may optionally be displayed with a timer that counts down in order to allow the driver to prepare for the maneuver.

Running lights (lights arranged in spaced out sequence and activated in succession to lead the driver's eyes from a specific location to a different location) can be used to encourage the driver to look at certain areas in a timely fashion. Alternatively, strategically placed lights can be turned on to encourage the driver to look in a specific direction (e.g. a light embedded in the right hand mirror can be used to encourage the driver to look in that mirror).

Step by step instructions may be listed on a graphical display, where the next action to take is highlighted.

Force feedback can be used to guide the driver to not perform certain actions. E.g. if the driver should reduce speed, the accelerator pedal may be made to feel "heavy" or even vibrate, when the driver tries to depress it. Or if the driver tries to change gear, but the optimal gear is already in place, the gear level would respond by feeling "heavy" or vibrate when the driver tries to shift it. A driver that is supposed to focus on improving his distance to lead vehicles will receive force feedback through the accelerator when trying to close the gap to the lead vehicle, similarly the driver will receive force feedback when a lead vehicle reduces speed and consequently decreases the distance between the own vehicle and the lead vehicle, encouraging the driver to reduce the speed proportionally.

Furthermore, in one example, the tutorial may include an offline part where the driver receives feedback as well as instructions via a smartphone, a web interface or similar. The offline evaluation and analysis will then make use of categorized video data so that the driver will be provided with case examples demonstrating both good and bad behavior of relevance for the specific areas the driver needs to improve his/hers abilities in. For example, if the driver needs to improve the distance keeping ability, examples of when the drivers' (or a peer drivers') driving behavior resulted in an incident or near incident due to this problem, and when a good distance keeping ability helped avoid a potentially critical situation.

In one embodiment of the invention the tutorial mode may also be engaged in a scheme where the area of improvement is based on when the driving takes place (e.g. night time), or where (city-driving, highway, etc.), or the type of driving (reversing, ranging, hill-climbing), or type of vehicle (extra long or heavy vehicle), or a combination of these.

Even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. For example, the invention has mainly been described above with reference to a few embodiments. However, as is readily appreciated by the skilled addressee, other embodiments than the ones disclosed above are equally possible within the scope of the invention, as defined by the appended patent claims. For example, the invention is also applicable for trucks, buses, dumpers, wheel loaders and other type of vehicles than the above described car.

Furthermore, the person skilled in the art readily realizes that the tutorial task may relate to a wide range of desired behaviors for example related to fuel-efficient driving, comfortable driving or driving for minimizing wear and tear of a vehicle.

In the claims, the word "comprises" does not exclude other elements or steps, and the indefinite article "a" or "an" does not exclude a plurality. A single computer or other unit may fulfill the functions of several items recited in the claims. The mere fact that certain measures are recited in mutually different dependent claims does not indicate that a combination of these measured cannot be used to advantage.

The invention claimed is:

1. A method for providing a tutorial message to a driver in a vehicle using an in-vehicle tutorial system comprising a multimodal user interface, the vehicle comprising a processing unit and a plurality of sensors arranged internally and externally of the vehicle and configured to determine a driving context for the driver, wherein the method comprises the steps of:

assigning at least an area of improvement, comprising at least one tutorial task, to the tutorial system, wherein different areas of improvement are related to one of a plurality of predefined different categories of improvement;

identifying, using the processing unit, a driving context using information collected using the plurality of sensors provided with the vehicle for which a tutorial task is to be performed, the driving context comprising an operational context relating to environmental, vehicle, and traffic conditions under which the vehicle is operated wherein one of the plurality of sensors arranged internally of the vehicle is adapted to measure and detect a behavior of the driver during vehicle operation;

based on the tutorial task and the driving context, selecting a tutorial message for the operational context, the tutorial message encouraging a desired driving behavior;

providing the selected tutorial message to the driver using the multimodal user interface, wherein the tutorial message is provided as at least a combination of two of an audio, voice, visual, and haptic output during vehicle operation and after vehicle operation;

logging a driver response to the provided tutorial message; and determining a correlation between the desired driving behavior and the driver response;

determining a goal fulfillment based on the correlation between the desired driving behavior and the driver response; and selecting a further area of improvement to assign to the tutorial system based on the goal fulfillment, wherein the step of determining the correlation between the desired driving behavior and the driver response comprises relating the driver response to at least one of the plurality of predefined categories of improvement and establishing a skill level of the driver as one of at least novice driver and more skilled driver, the step of selecting the further area of improvement to be assigned to the tutorial system is further based on previous assignments to the plurality of predefined categories of improvement, and the step of selecting the tutorial message is at least partially based on the skill level of the driver.

2. Method according to claim 1, further comprising determining an accumulated goal fulfillment by adding a plurality of determined goal fulfillments.

3. Method according to claim 2, further comprising selecting an area of improvement to assign to the tutorial system based on the accumulated goal fulfillment.

4. Method according to claim 1, wherein assigning an area of improvement comprises, manually assigning an area of improvement by the driver, remotely assigning an area of improvement by a third party or automatically assigning an area of improvement by the tutorial system.

5. Method according to claim 4, wherein the allowability of manually assigning an area of improvement by the driver is determined based on the accumulated goal fulfillment for the driver.

6. Method according to claim 1, wherein the area of improvement is assigned by a back office unit.

7. Method according to claim 1, wherein the driving context and the corresponding tutorial task are logged for allowing the driver to be allowed to review in an offline state, thereby allowing the driver to receive further tutorial messages.

8. Method according to claim 1, wherein the tutorial message is selected from a plurality of predetermined tutorial messages.

9. Method according to claim 2 wherein the tutorial message is selected based on the accumulated goal fulfillment.

10. Method according to claim 9, wherein the plurality of tutorial messages comprises a plurality of tutorial messages of different degree of detail for each tutorial task.

11. Method according to claim 2, wherein the logged driver's response is used as future reference for desired driving behavior.

12. An in-vehicle tutorial system for providing a tutorial message to a driver in a vehicle, the system comprising:
a multimodal user interface;
a plurality of sensors comprised with the vehicle and arranged internally and externally of the vehicle and configured to determine a driving context;
a processing unit configured to:
assign at least an area of improvement, comprising at least one tutorial task, to the tutorial system, wherein different areas of improvement are related to one of a plurality of predefined different categories of improvement;
identify a driving context using information collected using the plurality of sensors provided with the vehicle for which a tutorial task is to be performed, the driving context comprising an operational context relating to environmental, vehicle, and traffic conditions under which the vehicle is operated, wherein one of the plurality of sensors arranged internally of the vehicle is adapted to measure and detect a behavior of the driver during vehicle operation;
based on the tutorial task and the driving context, select a tutorial message for the operational context, the tutorial message encouraging a desired driving behavior;
provide the selected tutorial message to the driver using the multimodal user interface, wherein the tutorial message is provided as at least a combination of two of an audio, voice, visual, and haptic output during vehicle operation and after vehicle operation;
log a driver response to the provided tutorial message;
determine a correlation between the desired driving behavior and the driver response;
determine a goal fulfillment based on the correlation between the desired driving behavior and the driver response; and
select a further area of improvement to assign to the tutorial system based on the goal fulfillment,
wherein determining the correlation between the desired driving behavior and the driver response comprises relating the driver response to at least one of the plurality of predefined categories of improvement and establishing a skill level of the driver as one of at least novice driver and more skilled driver, the step of selecting the further area of improvement to be assigned to the tutorial system is further based on previous assignments to the plurality of predefined categories of improvement, and the step of selecting the tutorial message is at least partially based on the skill level of the driver.

13. A non-transitory computer readable medium embodying a computer program product for providing a tutorial message to a driver in a vehicle using an in-vehicle tutorial system comprising a multimodal user interface, the vehicle comprising a plurality of sensors configured to determine a driving context for the driver the computer program product comprising code configured to, when executed by a processor:
assign at least an area of improvement, comprising at least one tutorial task, to the tutorial system, wherein different areas of improvement are related to one of a plurality of predefined different categories of improvement;
identify a driving context using information collected using the plurality of sensors provided with the vehicle for which a tutorial task is to be performed, the driving context comprising an operational context relating to environmental, vehicle, and traffic conditions under which the vehicle is operated, wherein one of the plurality of sensors arranged internally of the vehicle is adapted to measure and detect a behavior of the driver during vehicle operation;
based on the tutorial task and the driving context, select a tutorial message for the operational context, the tutorial message encouraging a desired driving behavior,
provide the selected tutorial message to the driver using the multimodal user interface, wherein the tutorial message is provided as at least a combination of two of an audio, voice, visual, and haptic output during vehicle operation and after vehicle operation;
log a driver response to the provided tutorial message;
determine a correlation between the desired driving behavior and the driver response;
determine a goal fulfillment based on the correlation between the desired driving behavior and the driver response; and
select a further area of improvement to assign to the tutorial system based on the goal fulfillment,
wherein determining the correlation between the desired driving behavior and the driver response comprises relating the driver response to at least one of the plurality of predefined categories of improvement and establishing a skill level of the driver as one of at least novice driver and more skilled driver, the step of selecting the further area of improvement to be assigned to the tutorial system is further based on previous assignments to the plurality of predefined categories of improvement, and the step of selecting the tutorial message is at least partially based on the skill level of the driver.

* * * * *